US011415286B2

United States Patent
Takenaga (10) Patent No.: US 11,415,286 B2
(45) Date of Patent: Aug. 16, 2022

(54) VEHICLE LAMP

(71) Applicant: KOITO MANUFACTURING CO., LTD., Tokyo (JP)

(72) Inventor: Kohei Takenaga, Shizuoka (JP)

(*) Notice: Subject to any disclaimer, the term of this patent is extended or adjusted under 35 U.S.C. 154(b) by 0 days.

(21) Appl. No.: 17/025,546

(22) Filed: Sep. 18, 2020

(65) Prior Publication Data

US 2021/0095828 A1   Apr. 1, 2021

(30) Foreign Application Priority Data

Sep. 26, 2019 (JP) .............................. JP2019-174870

(51) Int. Cl.
*F21S 41/24* (2018.01)
*F21V 8/00* (2006.01)
*F21S 43/10* (2018.01)
*F21S 41/147* (2018.01)
*F21S 43/239* (2018.01)
*F21Y 115/10* (2016.01)

(52) U.S. Cl.
CPC ............. *F21S 41/24* (2018.01); *F21S 41/147* (2018.01); *F21S 43/10* (2018.01); *F21S 43/239* (2018.01); *G02B 6/0031* (2013.01); *F21Y 2115/10* (2016.08)

(58) Field of Classification Search
CPC .......... F21S 41/24; F21S 41/147; F21S 43/10; F21S 43/239; G02B 6/0031; F21Y 2115/10

USPC .......................................................... 362/511
See application file for complete search history.

(56) References Cited

U.S. PATENT DOCUMENTS

| | | | | |
|---|---|---|---|---|
| 7,857,495 B2* | 12/2010 | Misawa | ................ | F21S 43/239 362/511 |
| 2014/0071703 A1* | 3/2014 | Motomura | ............ | F21S 43/239 362/511 |
| 2016/0040850 A1* | 2/2016 | Orisich | .................... | F21S 43/14 362/511 |
| 2016/0138772 A1* | 5/2016 | Sato | ........................ | G02B 6/003 362/511 |
| 2016/0178827 A1* | 6/2016 | Thorailler | ............ | G02B 6/0006 362/555 |
| 2016/0193954 A1* | 7/2016 | Nakada | ................. | F21S 43/245 362/511 |

FOREIGN PATENT DOCUMENTS

| | | |
|---|---|---|
| JP | 2015-201278 A | 11/2015 |
| JP | 2019-016499 A | 1/2019 |

* cited by examiner

*Primary Examiner* — Andrew J Coughlin
*Assistant Examiner* — Jessica M Apenteng
(74) *Attorney, Agent, or Firm* — Venjuris, P.C.

(57) ABSTRACT

A vehicle lamp includes a plurality of light sources, and a light guide that guides light from the light sources incident from a light incident portion and emits the light from a light emitting portion. The light guide includes a light deflecting portion that deflects a guide direction of the light between the light incident portion and the light emitting portion. The light deflecting portion deflects each light from the plurality of light sources toward the same area of the light emitting portion.

14 Claims, 9 Drawing Sheets

VEHICLE LAMP

CROSS-REFERENCE TO RELATED APPLICATIONS

This application is based on and claims priority from Japanese Patent Application No. 2019-174870, filed on Sep. 26, 2019, with the Japan Patent Office, the disclosure of which is incorporated herein in its entirety by reference.

TECHNICAL FIELD

The present disclosure relates to a vehicle lamp including a lamp unit suitable to be applied to an indicating light or an auxiliary light of an automobile.

BACKGROUND

A vehicle lamp such as a head lamp or a tail lamp of an automobile is often configured as a complex type lamp in which a plurality of lamp units having different functions is incorporated in a lamp housing. In such a vehicle lamp, a lamp unit called an edge light has been proposed as one of the lamp units in recent years. The edge light uses a plate shape light guide. Light from a light source is incident on the light guide and guided through the inside of the light guide, and led out from an elongated edge surface (end surface) of the light guide, so that a line-shaped light emission with the edge surface as a light emitting surface is possible.

For example, in the lamp unit disclosed in Japanese Patent Laid-Open Publication No. 2019-016499, light from a light source is incident on one surface of a light guide and is internally reflected by a reflecting surface provided on the other surface, so as to guide the reflected light through the inside of the light guide toward the front of a lamp, and to emit from an edge surface of the light guide. In the lamp unit disclosed in Japanese Patent Laid-Open Publication No. 2015-201278, light from a light source is guided toward the front by an incident portion formed in a light guide, and emitted from an emitting surface provided in the light guide.

SUMMARY

In recent years, it has been considered to configure one lamp unit as a multi-function type lamp that is turned on with a plurality of functions. For example, a plurality of light sources corresponding to a plurality of different functions is provided with respect to the same light guide and the light emission of the light sources is selectively controlled, so as to function as a plurality of functional lamps by performing light irradiation with different light emission colors or luminous intensity. For example, Japanese Patent Laid-Open Publication No. 2015-201278 discloses a technology in which two types of light sources that emits different light colors are provided, and the light sources selectively emit light to be emitted through a light guide, so as to function as a day light running lamp or a turn signal lamp.

In the technique disclosed in Japanese Patent Laid-Open Publication No. 2015-201278, lights from the two types of light sources are incident on the light guide from different positions and directions, and thus, the light paths of the lights guided through the inside of the light guide are different from each other. Therefore, the emission forms of the lights emitted from an emitting surface, in particular, the emission areas or the emission directions of the lights from the emitting surface are different from each other. As a result, when the lamp unit is turned on as a multi-function lamp, deflection occurs in brightness (luminous intensity) in the emitting surface of the light guide in each function, and the appearance quality may be deteriorated.

The present disclosure is to provide a vehicle lamp having a high appearance quality which provides a light emitting surface with no deflection of brightness at the time of turning-on, even when the vehicle lamp is configured as a multi-function lamp.

A vehicle lamp according to the present disclosure includes a plurality of light sources and a light guide configured to guide light from the plurality of light sources incident from a light incident portion and emit the light from a light emitting portion. The light guide includes a light deflecting portion that deflects a guide direction of the light between the light incident portion and the light emitting portion. The light deflecting portion is configured to deflect the light from each of the plurality of light sources toward the same area of the light emitting portion.

The light deflecting portion may be configured as a reflecting surface that internally reflects light guided in the light guide. In this case, the light incident portion is configured to cause the light from the plurality of light sources to be incident in the same direction, and the light deflecting portion is constituted by a plurality of reflecting surfaces having different inclination angles with respect to the incident direction of each light from the plurality of light sources.

Further, according to the present disclosure, for example, the light guide is formed in a plate shape having one end surface serving as the light deflecting portion and the other end surface serving as the light emitting portion, and the light incident portion is formed in a portion close to the one end portion. In this case, the plurality of light reflecting surfaces are configured to be arranged in a direction that is the same as a width direction of the light emitting portion of the light guide. Further, a width dimension of the light incident on the light guide from the light incident portion is substantially the same as a width dimension of the light emitting portion.

According to the present disclosure, since lights from the different light sources may be emitted from the same area in the light emitting portion of the light guide, deflection of the brightness in the light emitting portion at the time of turning-on as a lamp having different functions, that is, deflection of the brightness in the light emitting surface may be prevented, and thus, the design effect may be enhanced at the time of turning-on.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 7A to 7D are views illustrating turning-on of the EG unit with white light and amber light.

FIGS. 8A to 8C are views for explaining light emission in a referenced example.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Figure 1:
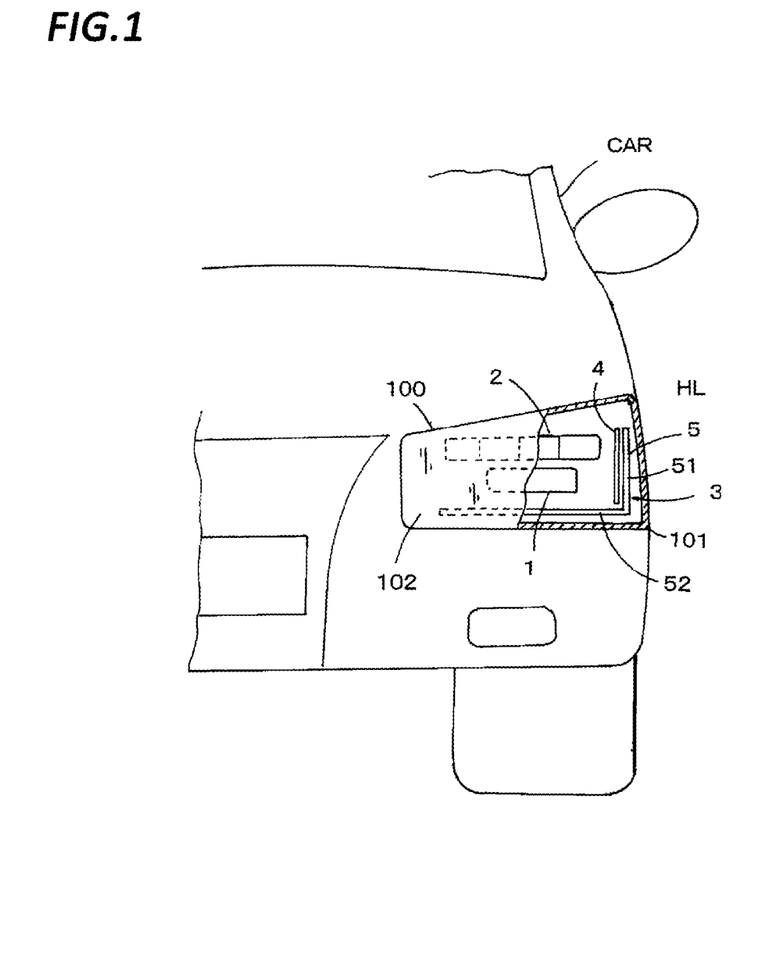
FIG. 1 is a front view of a part of an automobile including a head lamp according to the present disclosure.

Next, embodiments of the present disclosure will be described with reference to the drawings. FIG. 1 is a front view of an embodiment in which the present disclosure is applied to a left head lamp of an automobile CAR. A head lamp HL includes a lamp housing 100 arranged in a left front portion of the body of the automobile CAR, and a plurality of lamp units 1, 2, and 3 is arranged in the lamp housing 100. The lamp housing 100 is constituted by a lamp body 101 having an opening on the front side and a translucent cover 102 attached to the opening. In the specification, each direction of up, down, left, and right is based on FIG. 1. Further, in the front and rear directions, a direction in which light is emitted from the head lamp HL is set to the front direction.

Figure 2:
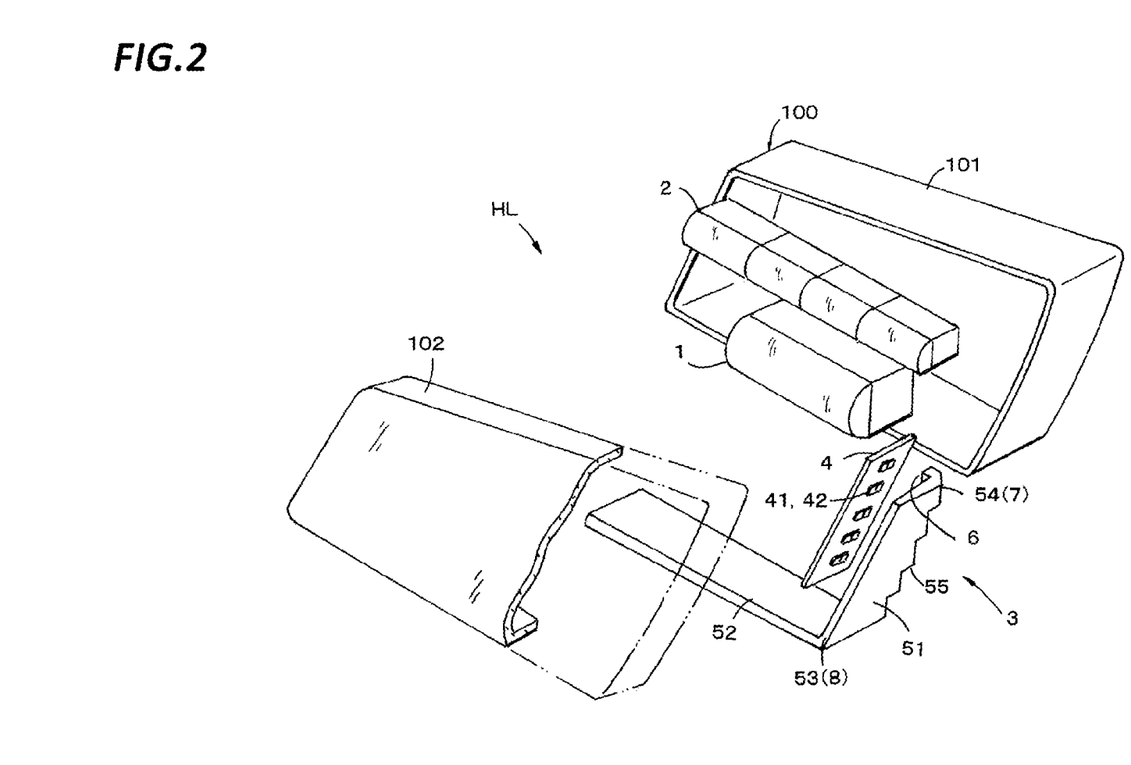
FIG. 2 is a partial exploded schematic perspective view of the head lamp partially exploded.

FIG. 2 is a schematic partial exploded perspective view of the head lamp HL, and the plurality of lamp units 1, 2, and 3 are configured by one low beam lamp unit (hereinafter, referred to as a Lo unit) 1, a high beam lamp unit (hereinafter, referred to as a Hi unit) 2 configured in four horizontal rows, and one edge lamp unit 3. The edge lamp unit (hereinafter, referred to as an EG unit) 3 is a lamp unit called as the edge light described above.

The Lo unit 1 is arranged substantially in the center in the lamp housing 100, and the Hi unit 2 is arranged on the upper side thereof in parallel in the left-right direction. The Lo unit 1 and the Hi unit 2 are configured as a projector type lamp unit having a light emitting diode (LED) as a light source, respectively. Since the structure of the projector type lamp unit having an LED as a light source is already known, detailed descriptions thereof will be omitted here.

When the Lo unit 1 is turned on, the Lo unit 1 illuminates a low beam light distribution area in front of the automobile. When all the four rows of the Hi unit 2 are turned on, the Hi unit 2 illuminates a high beam light distribution area in front of the automobile. The Hi unit 2 may be configured such that control of an ADB light distribution that prevents dazzling of an oncoming vehicle or a preceding vehicle may be possible by selectively turning on/off one or a plurality of four rows of the Hi unit 2.

The EG unit 3 is configured as a lamp unit extending in a line shape along a lower side portion from one side in the left-right direction in the lamp housing 100, here, a side portion on the right side that is an outer side in the vehicle width direction. Then, as described later, the EG unit 3 is configured as a multi-function type lamp having three types of functions, that is, a clearance lamp (hereinafter, referred to as a CCL), a daytime running lamp (hereinafter, referred to as a DRL), and a turn signal lamp (hereinafter, referred to as a TSL) at the time of turning-on or blinking.

Figure 3:
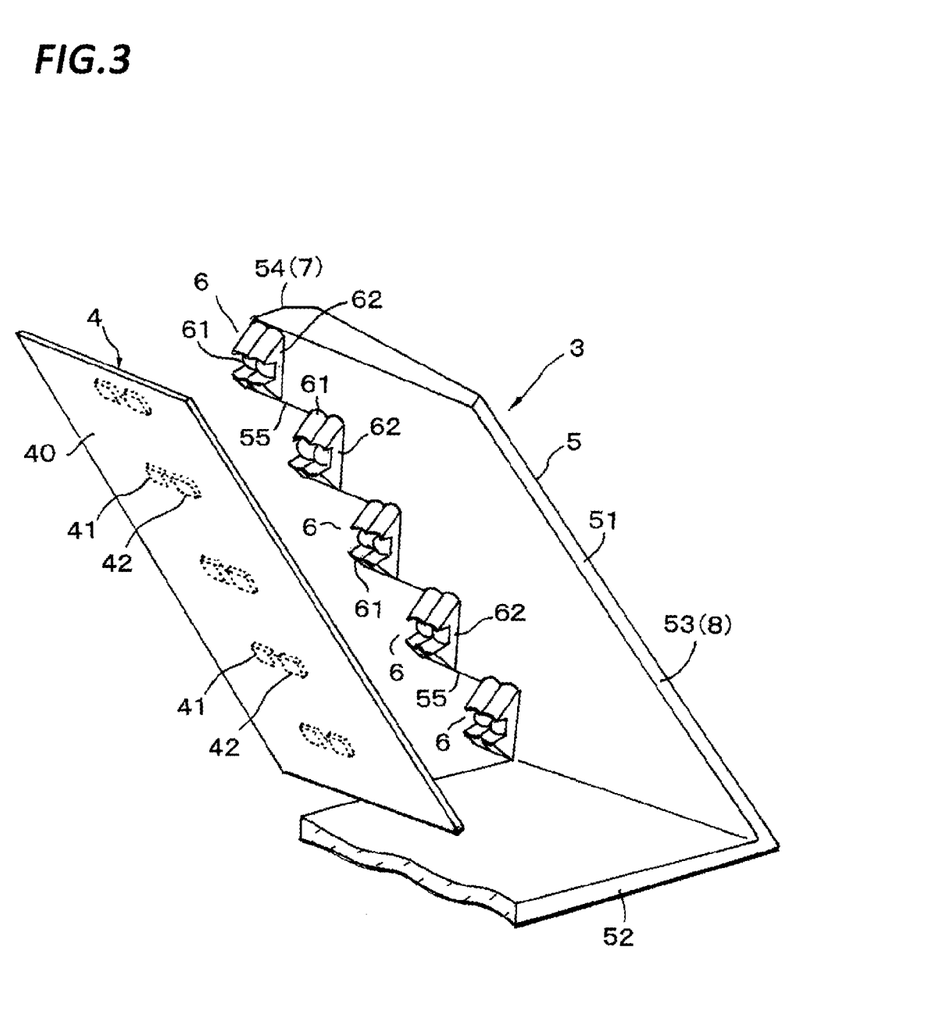
FIG. 3 is a perspective view of an EG unit viewed from a diagonal left front side.

FIG. 3 is an external perspective view of the EG unit 3 viewed from a diagonal left front side. The EG unit 3 includes a light source 4, and a light guide 5 configured to guide light emitted from the light source 4 and emit the light toward the front side of the lamp. The light guide 5 is made of a translucent member, for example, a transparent resin, and as described above, formed in a plate shape having a side portion 51 and a lower side portion 52 that are bent in a substantially inverted L shape in the thickness direction so as to follow the shape from the right side portion to the lower side portion of the lamp housing 100.

The side portion 51 of the light guide 5 has a substantially straight line shape in the vertical direction or is slightly curved outward. Here, an example in which the side portion 51 is formed in a straight line shape is illustrated. The side portion 51 is formed in a tapered shape such that a lower portion of an end surface (hereinafter, referred to as a front end surface) 53 on the side facing the front side is inclined forward along the shape of the translucent cover 102. Further, an end surface (hereinafter, referred to as a rear end surface) 54 on the rear side is inclined forward so as to be substantially parallel to the front end surface 53, and is formed in a step shape having a plurality of, here, five step portions 55 along the vertical direction. Further, as will be described later in detail, the side portion 51 is formed in a tapered shape in which the thickness dimension is gently decreased from the rear end surface 54 toward the front end surface 53.

The plurality of step portions 55 in the rear end surface 54 of the light guide 5 are provided with a plurality of (here, five) incident portions 6 integrally formed in the left side surface, respectively. Each of the plurality of light incident portions 6 has the same configuration, and includes a first light incident portion 61 and a second light incident portion 62 disposed in parallel in the front-rear direction. Here, the first light incident portion 61 is disposed on the rear side, and the second light incident portion 62 is disposed on the front side to be adjacent to the first light incident portion 61. The plurality of light incident portions 6 are disposed at a necessary interval in the front-rear direction of the light guide 5, but are disposed so that a gap is not formed between the adjacent light incident portions 6 in the vertical direction.

The rear end surface 54 of the light guide 5 is configured as a light deflecting portion 7 that deflects light incident from the light incident portion 6 toward the front end surface 53 of the light guide 5. Here, the light deflecting portion 7 is configured as a reflecting surface that performs deflection using an internal reflection by the rear end surface 54 of the light guide 5.

The front end surface 53 of the light guide 5 is configured as a light emitting portion 8 that emits the light deflected by the light deflecting portion 7. The light emitting portion 8 becomes a light emitting surface when the EG unit 3 is turned on.

The light source 4 includes a light source substrate 40 disposed along the left side surface of the light guide 5 so as to face the plurality of light incident portions 6, and is provided with a number of light emitting elements corresponding to the plurality of first light incident portions 61 and second light incident portions 62, here, first LEDs (light emitting diodes) 41 that emit white light and second LEDs 42 that emit amber light. The first LED 41 is disposed to face the first light incident portion 61, and the emitted white light is incident on the first light incident portion 61. Further, the second LED 42 is disposed to face the second light incident portion 62, and the emitted amber light is incident on the second light incident portion 62.

The light source substrate 40 is electrically connected to a turning-on circuit (not illustrated), and the light emission of the first LED 41 and the second LED 42 is controlled based on a turning-on signal from the turning-on circuit. As will be described later, when the EG unit 3 functions as a CLL or a DRL, the first LED 41 is emitted, and when the EG unit 3 functions as a TSL, the second LED 42 is intermittently emitted.

Figure 4:
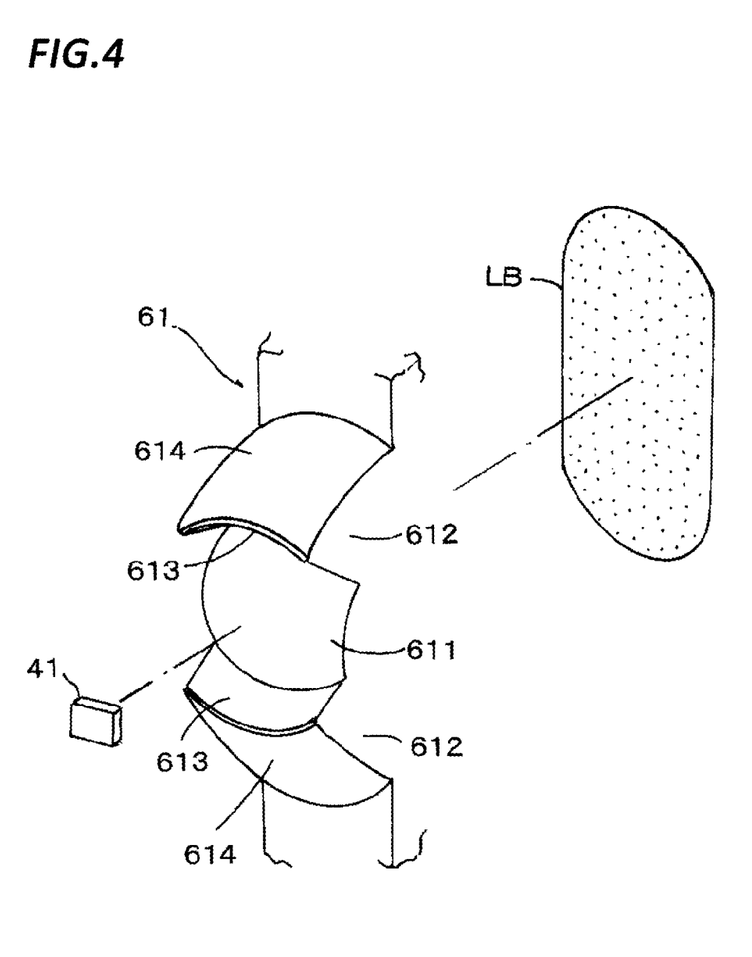
FIG. 4 is a plan view of a side portion of the EG unit.

The first light incident portion 61 and the second light incident portion 62 of the light incident portion 6 are integrally formed with the light guide 5 by a translucent member. FIG. 4 is a schematic perspective view of the first light incident portion 61, and the first light incident portion 61 includes a main incident portion 611 positioned in the center so as to face the center of the light emitting surface of the first LED 41, and a pair of secondary incident portions 612 positioned above and below the main incident portion 611 and line-symmetrical in the vertical direction. Light from the first LED 41 is incident on the first light incident portion 61, and the incident light is incident on the light guide 5 in a parallel light state.

Figure 5:
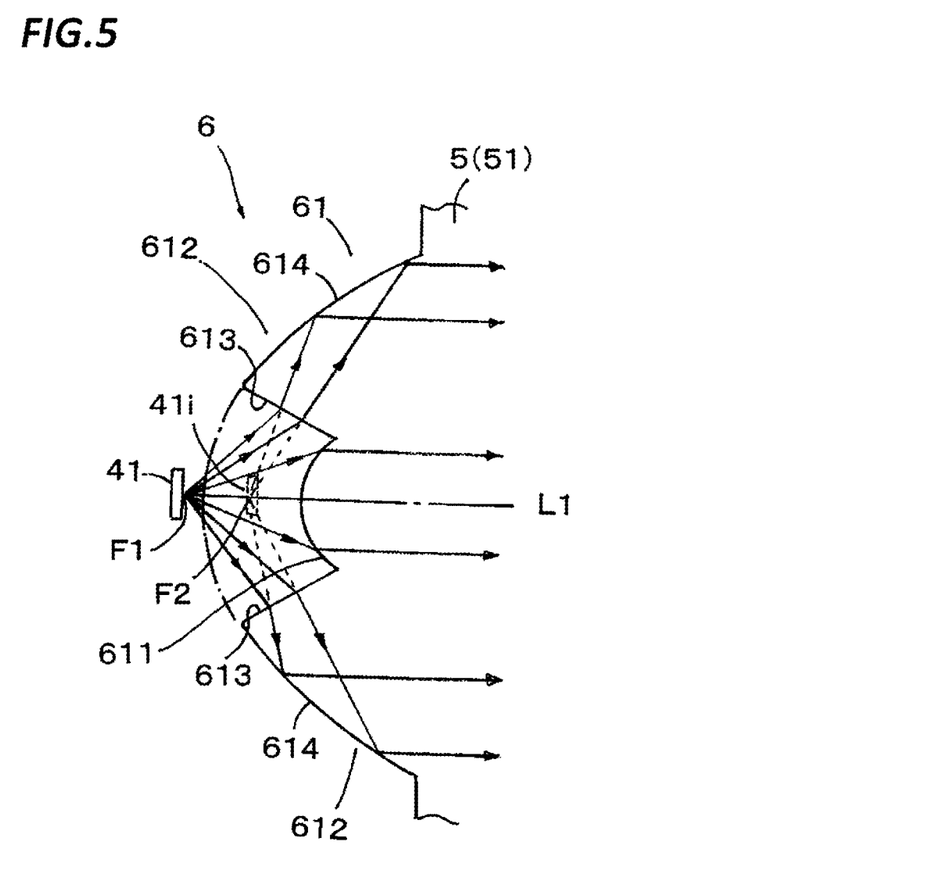
FIG. 5 is a schematic vertical cross-sectional view of a light incident portion (first incident portion).

FIG. 5 is schematic vertical cross-sectional view of the first light incident portion 61 in FIG. 4. The main incident portion 611 of the first light incident portion 61 is formed in a spherical surface that forms a convex lens, and a focal point F1 on a lens optical axis Lx is positioned in the light emitting surface of the first LED 41. As a result, the main incident portion 611 converges the incident light from the first LED 41 into substantially parallel light and guides the light toward the light deflecting portion 7.

Each of the upper and lower secondary incident portions 612 includes an inner surface 613 formed of a part of an inverted conical surface and an outer surface 614 formed of a part of a paraboloid of rotation. Light from the first LED 41 is incident on the inner surface 613 of both secondary incident portions 612 and refracted. The refracted light is internally reflected by the outer surface 614. A virtual image (virtual light source) 41i of the first LED 41 is formed by the light refraction by the inner surface 613. The outer surface 614 is formed as a paraboloid of rotation with the virtual image 41i of the first LED 41 as a focal point F2. As a result, the secondary incident portion 612 converges the incident light from the first LED 41 into substantially parallel light and guides the light toward the light deflecting portion 7.

Since the second light incident portion 62 has the same configuration, detailed descriptions will be omitted. Here, the width dimension of each of the first light incident portion 61 and the second light incident portion 62, that is, the dimension in the horizontal direction when the respective light incident portions 61 and 62 are viewed from the front is substantially equal to the width dimension of the front end surface 53 of the light guide 5, that is the dimension of the light emitting portion 8 in the left-right direction when viewed from the front of the light guide 5.

Figure 6:
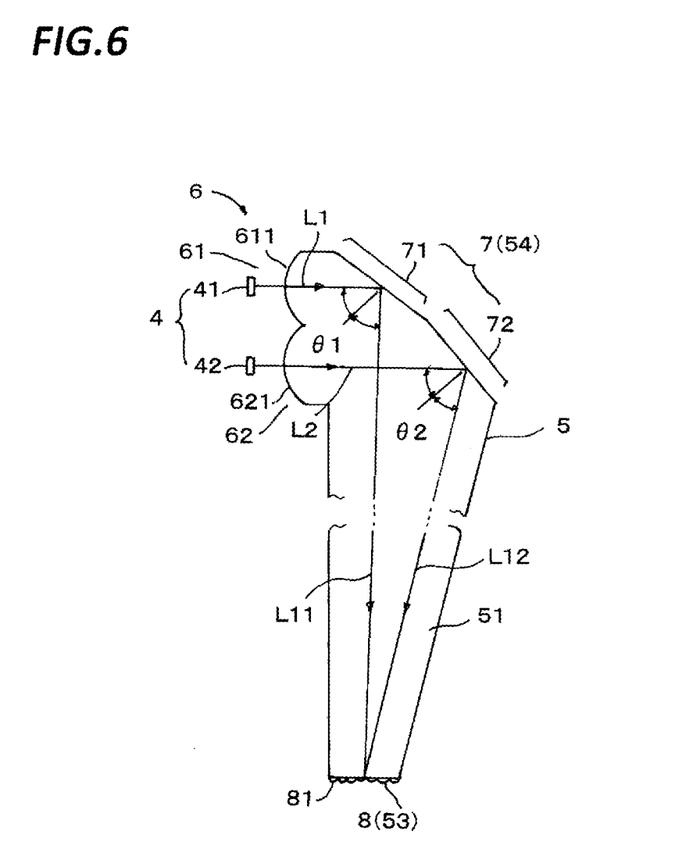
FIG. 6 is a horizontal cross-sectional view illustrating mutual relationship of a light incident portion, a light deflection portion, and a light emitting portion with a part of a light guide omitted.

FIG. 6 is a horizontal cross-sectional view in which a part of the light guide 5 (side portion 51) including the light incident portion 6 and the light deflecting portion 7 is omitted. The light deflecting portion 7 is configured as the rear end surface 54 of the light guide 5, and the rear end surface 54 is divided into two areas, that is, a first reflecting surface 71 and a second reflecting surface 72 that are elongated in the vertical direction. Each of the surfaces 71 and 72 is disposed corresponding to the above-described first light incident portion 61 and the second light incident portion 62, respectively, and the horizontal center of the first reflecting surface 71 on the side close to the first light incident portion 61 is substantially disposed on the lens optical axis L1 of the main incident portion 611, and the horizontal center of the second reflecting surface 72 is substantially disposed on a lens optical axis L2 of a main incident portion 621 of the second LED 42.

Here, both of the first reflecting surface 71 and the second reflecting surface 72 are formed as plan surfaces, but the inclination angles of them in the horizontal direction are different from each other. That is, when it is assumed that an angle made by a line segment L11 that connects an intersection point P1 where the lens optical axis L1 of the first light incident portion 61 intersects the first reflecting surface 71 and a center point P0 of the light emitting surface 8 (front end surface 53) of the light guide 5 in the width direction, and the lens optical axis L1 is θ1, the inclination angle of the first reflecting surface 71 is set so that the angle formed by the normal line of the first reflecting surface 71 with respect to the lens optical axis L1 is θ1/2. In the same way, when it is assumed that an angle made by a line segment L12 that connects an intersection point P2 where the lens optical axis L2 of the second light incident portion 62 intersects the second reflecting surface 72 and the center point P0 of the light emitting surface 8 (front end surface 53) of the light guide 5 in the width direction, and the lens optical axis L2 is θ2, the inclination angle of the second reflecting surface 72 is set so that the angle formed by the normal line of the second reflecting surface 72 with respect to the lens optical axis L2 is θ2/2.

While the light deflecting portion 7 is configured as described above, the front end surface 53 of the light guide 5, that is, the light emitting portion 8 is formed to have a width dimension substantially equal to each of the width dimension of the first and second light incident portions 61 and 62. As a result, the side portion 51 of the light guide 5 has a width dimension of the light emitting portion 8 smaller than a width dimension of the light deflecting portion 7, and is formed in a tapered shape as described above.

Further, as schematically illustrated in FIG. 6, a fine optical step 81 is integrally formed on the surface of the light emitting portion 8 (front end surface 53) of the light guide 5. The optical step 81 may be configured as a fine cylindrical surface (cylindrical surface), a fine spherical surface, or a rough surface by so-called emboss process. By the optical step 81, the light emitted from the light emitting portion 8 of the light guide 5 is diverged or diffused, and the light emitting portion 8 is configured as a light emitting surface that emits light toward a wide angle area.

Figure 7A:
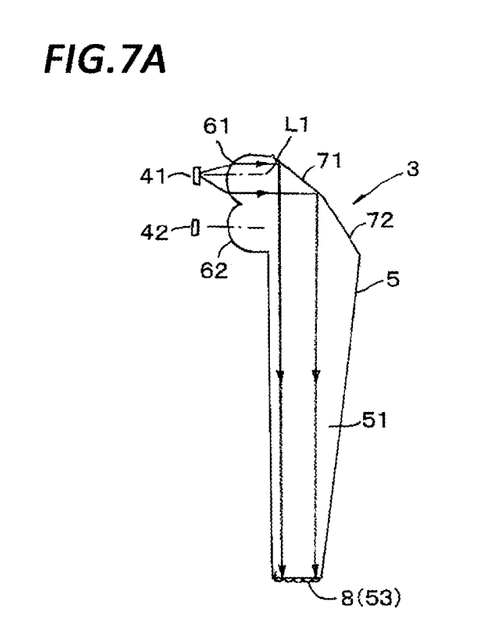
FIGS. 7A and 7C are schematic horizontal cross-sectional views.

According to the EG unit 3 having the above-described configuration, as schematically illustrated in the horizontal cross-section of the side portion 51 of the light guide 5 in FIG. 7A, the first LED 41 emits light with a predetermined luminous intensity when functioning as a CLL. White light from the first LED 41 is incident on the first light incident portion 61. The light incident on the main incident portion 611 is converged into parallel light along the lens optical axis L1 or light close thereto. Further, although not illustrated in FIG. 7A, as illustrated in FIG. 5, the light incident on the secondary incident portion 612 is refracted by the inner surface 613, and then reflected by the outer surface

614, and converged into the parallel light along the lens optical axis L1 or light close thereto.

These lights are combined into light LB having a luminous flux shape illustrated in FIG. 4. Further, each light of the first light incident portions 61 of the plurality of light incident portion 6 is combined in the vertical direction. Here, each light of the five first light incident portions 61 is combined in the connected state in the vertical direction and is combined into an elongated luminous flux shape in the vertical direction. As described above, the width dimension of the light combined by the plurality of first light incident portions 61 is substantially equal to the width dimension of the first light incident portion 61 when viewed from the front, and the width dimension is equal to the width dimension of the front end surface 53 of the light guide 5. Further, the combined light is continuous light in the vertical direction.

Figure 7B:
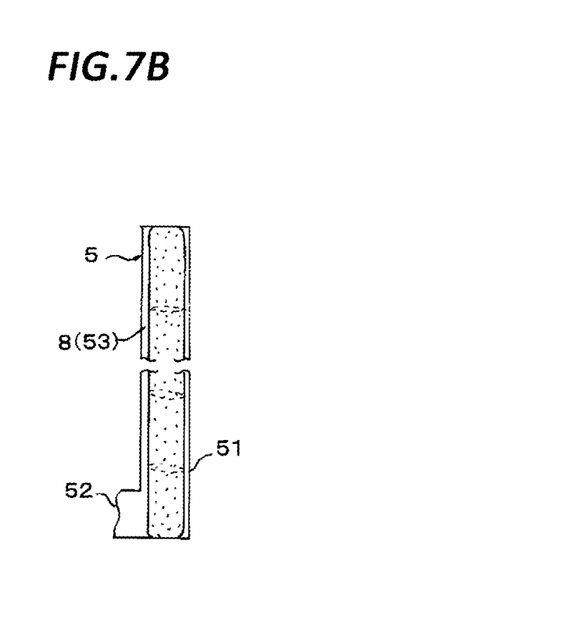
FIGS. 7B and 7D are views illustrating light emitting states in a light emitting surface.

The light incident from the plurality of first light incident portions 61 and combined is reflected by the first reflecting surface 71 of the light deflecting portion 7 through the inside of the light guide 5, and is deflected to the front direction of the light guide 5. The deflected light is emitted from the light emitting portion 8 of the light guide 5. The emitted light is diverged or diffused by the optical step 81, and is irradiated toward a required area. As a result, as illustrated by dots in FIG. 7B, the front end surface 53 of the light guide 5, that is, the light emitting portion 8 may function as a CLL having a light emitting surface with an enhanced design effect in which white light is turned on in a line shape with an elongated dimension equal to the width dimension of the light emitting portion 8.

When the EG unit 3 functions as a DRL, the luminous intensity of the white light emitted from the first LED 41 is adjusted. As a result, similarly to the case of a CLL in FIG. 7B, the light emitting portion 8 of the light guide 5 functions as a DLL having a light emitting surface with an enhanced design effect in which white light is turned on in a line shape with an elongated dimension.

Figure 7C:
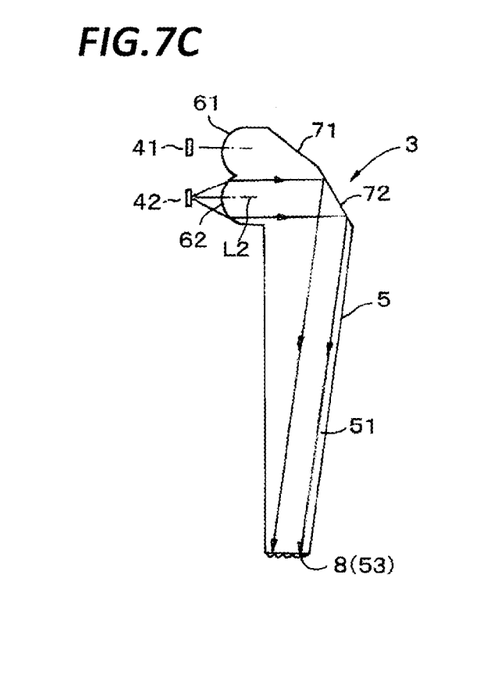

When the EG unit 3 functions as a TSL, as illustrated in FIG. 7C, the second LED 42 blinks and emits light with a predetermined luminous intensity. Amber light from the second LED 42 is incident on the second light incident portion 62. Although not illustrated, in the second light incident portion 62, the light incident on the main incident portion is converged into parallel light along the lens optical axis L2 or light close thereto. The light incident on the secondary incident portion is converged into parallel light along the optical axis or light close thereto. The light is combined and is guided toward the light deflecting portion 7 through the inside of the light guide 5. Each light of the five second light incident portions 62 is combined in the connected state in the vertical direction and is combined into an elongated luminous flux in the vertical direction.

Figure 7D:
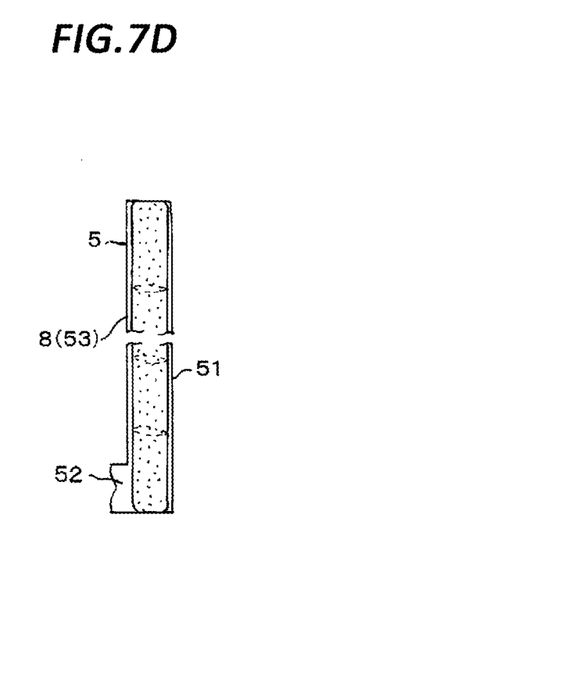

The guided light is reflected by the second reflecting surface 72 and deflected to the front side, and is emitted from the front end surface 53 of the light guide 5, that is, the light emitting surface 8. The emitted light is diverged or diffused by the optical step 81 formed in the light emitting surface 8, and is irradiated toward a required area. As a result, as illustrated by dots in FIG. 7D, the light emitting surface 8 functions as a TSL having a light emitting surface with an enhanced design effect in which amber light is blinked in a line shape with an elongated dimension equal to the width dimension of the light guide 5.

As described above, when the EG unit 3 is turned on as a CLL or a DRL, almost the entire area of the light emitting portion 8 of the light guide 5 emits white light by the white light of the first LED 41. Further, when the EG unit 3 is turned on as a TSL, almost the entire area of the light emitting portion 8 of the light guide 5 emits amber light by the amber light of the second LED 42. Therefore, in both the cases of turning on as a CLL or a DRL and the case of turning on as a TSL, almost the entire area of the light emitting portion 8, that is, the entire surface of the light emitting surface is in a turned-on state where light is emitted.

Since the first reflecting surface 71 and the second reflecting surface 72 that forms the light deflecting portion 7 are formed to have different inclination angles with respect to each of the lens optical axes L1 and L2 of the first light incident portion 61 and the second light incident portion 62 directed in the same direction, even when the EG unit 3 is turned on as a lamp having different functions, the light emitting area in the light emitting portion 8 at the time of turning-on for each function is the same. Further, the light emission in the light emitting portion 8 at the time of turning-on of each function is the light emission in almost the entire area. Therefore, in turning-on of any function, a non-light emitting area does not occur in a part of the light emitting portion 8, and a light emitting surface in which unevenness of the brightness does not occur is obtained, and thus, the appearance quality of the EG unit 3 at the time of turning-on may be enhanced.

Further, when the EG unit 3 is turned on as a lamp having different functions, light is emitted in substantially the same area of the light emitting portion 5 of the light guide, and thus, the light emitting portion 8 may be formed to have a minimum width dimension required for the light emission. Therefore, the light guide 5 may be formed to have a required minimum thickness dimension, and the thinness may be emphasized from the front end surface 53 of the light guide 5 observed from the outside of the head lamp HL, and the appearance quality of the EG unit 3 at the time of turning-off may be enhanced.

Figure 8A:
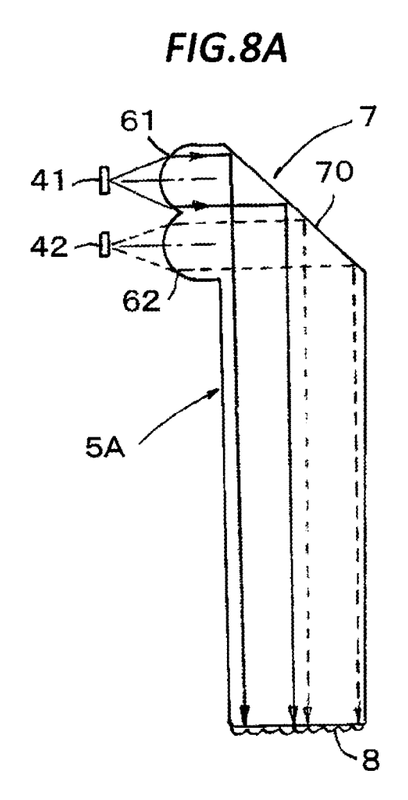
FIG. 8A is a schematic horizontal cross-sectional view.

Additionally, as illustrated in a light guide 5A of a reference example in FIG. 8A, if the light deflecting portion 7 is configured as a single plan reflecting surface 70 without being divided into a first reflecting surface and a second reflecting surface, when light from the first LED 41 and light from the second LED 42 are reflected at the reflecting surface 70, each light is deflected in the same direction, respectively. Therefore, the light from the first LED 41 is emitted from an area biased to the left side of the light emitting portion 8 as illustrated by dots in FIG. 8B, and the light from the second LED 42 is emitted from an area biased to the right side of the light emitting portion 8 as illustrated by dots in FIG. 8C.

As a result, at the time of turning-on of each function, a substantially ½ of the area of the light emitting portion 8 in the width direction emits light, and the rest of the area does not emit light, and thus, deflection occurs in the light emitting area in the light emitting portion 8 and the appearance quality of the light emitting surface at the time of turning-on is deteriorated. Further, the front end surface of the light guide 5A, that is the light emitting portion 8 is required to be formed to have the width dimension of the total light emitting area of each of the first LED 41 and the second LED 42, the thickness dimension of the light guide 5A increases, and the width dimension of the light emitting portion 8 increases, and thus, the appearance quality at the time of turning-off is deteriorated.

Figure 8B:
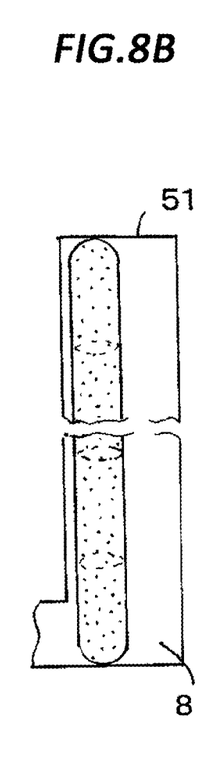
FIGS. 8B and 8C are views illustrating light emitting states in a light emitting surface.
Figure 8C:
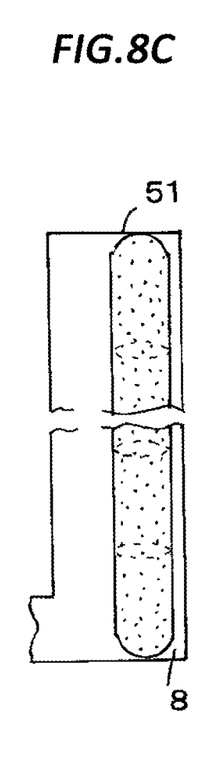

In the technology disclosed in Japanese Patent Laid-Open Publication No. 2015-201278 described above, similarly to the present disclosure, two LEDs that emits white light and amber light to a light guide are arranged, and the two LEDs selectively emit light to be turned on as a DRL or a TSL. In this configuration, the light from the two LEDs has different incident areas that are incident on the light guide, and the emission areas of the light emitted from the emitting surface are different from each other. As a result, when the LEDs are turned on as a different function, as illustrated in FIGS. 8B and 8C, deflection occurs in the light emitting area of the light emitting portion, and thus, it is difficult to improve the appearance quality of the light emitting surface.

Here, the light guide 5 according to the embodiment includes the lower side portion 52 extending to an area along the lower side of the lamp housing 100 as described above. In the lower side portion 52, a part of the light from the first LED 41 or the second LED 42 guided through the inside of the side portion 51 becomes leakage light and is guided in the front-rear direction and the left-right direction. Therefore, in the lower side portion 52, the guided leakage light is emitted from the front end surface while spreading in the left-right direction, and the lower side portion 52 becomes a light emitting state together with the side portion. The brightness of the light emission of the lower side portion 52 is lower than that of the side portion 51. However, the lower side portion 52 becomes a light emitting state integrally with the side portion, the design effect at the time of turning-on of the EG unit 3 may be enhanced.

The lower side portion 52 may be made to emit light more brightly, and in this case, the light incident portion and the light reflecting portion the same as the side portion 51 may be provided. In this case, since the front end surface of the lower side portion 52 extends in the horizontal direction, the width direction of the light emitting portion serving as the light emitting surface becomes the vertical direction. Therefore, the arrangement positions of the LED, the light incident portion, and the light deflecting portion are set to be disposed in an appropriate direction corresponding to the vertical direction.

Figure 9:
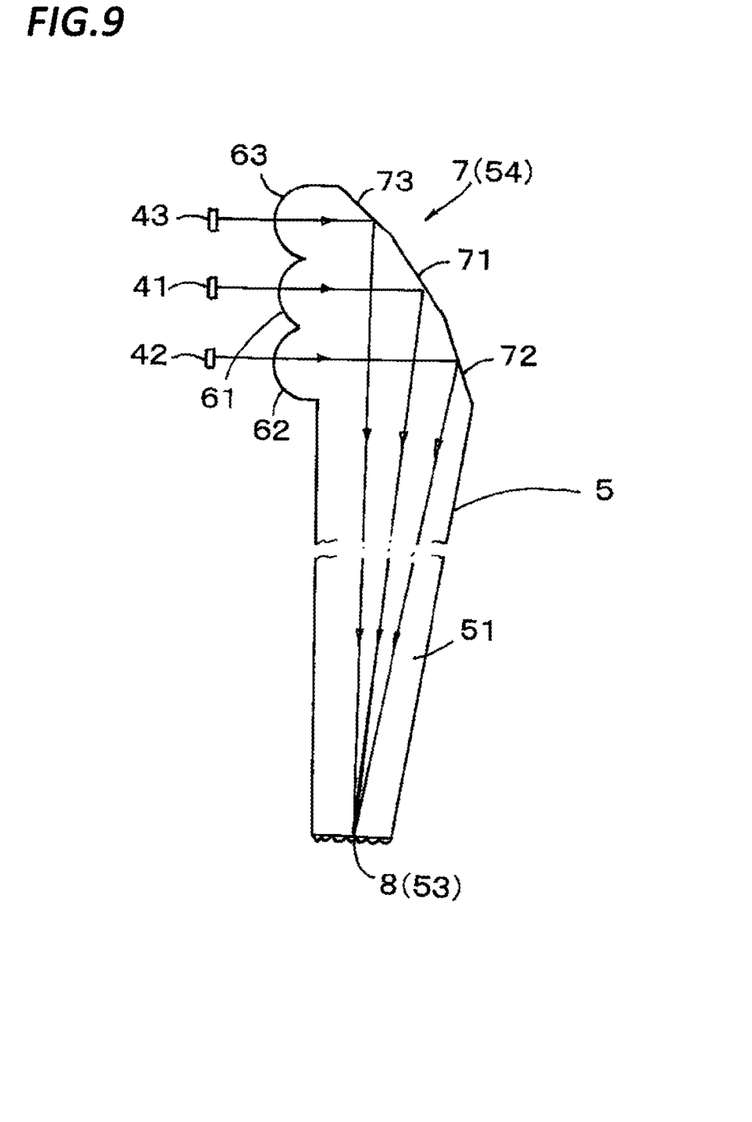
FIG. 9 is a schematic horizontal cross-sectional view of a part of an EG unit according to a modification of the present disclosure.

In the present disclosure, an EG unit may be configured by combining three or more types of light sources, that is, a light source having a different luminous intensity, a light source having a different emission color, and a light source having a different emission angle of emitted light. For example, when the light sources of a CLL, a DRL, and a TSL described in the embodiment is configured by an independent LED, respectively, as illustrated in a schematic horizontal cross-sectional view in FIG. 9, the first to third light incident portions 61, 62, and 63 corresponding to the three different light sources, for example, the first to third LEDs 41, 42, and 43, respectively, are provided. Further, corresponding to the above, the light deflecting portion 7 may be configured to have the first to third reflecting surfaces 71, 72, and 73.

The light source according to the present disclosure may adopt a laser diode (LD) element or an organic EL element as the light emitting element, instead of the LED. Further, a bulb (electronic bulb) may be used as the light source.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicle lamp comprising:
a plurality of light sources; and
a light guide configured to guide light from the plurality of light sources that is incident from a light incident portion and emit the light from a light emitting portion, the light incident portion including a first light incident portion and a second light incident portion,
wherein the light guide includes a light deflecting portion that deflects a guide direction of the light between the light incident portion and the light emitting portion, and
the light deflecting portion is configured to deflect the light from each of the plurality of light sources toward a same area of the light emitting portion,
wherein the plurality of light sources are different from each other in at least one of emission color, luminous intensity and light emission form,
a first light source of the plurality of light sources is configured to emit a white light and function as a daytime running lamp,
a second light source of the plurality of light sources is configured to emit an amber light and function as a turn signal lamp, and
the first light source and the second light source are disposed side by side in a front-rear direction of the vehicle lamp, and the first light incident portion and the second light incident portion of the plurality of light sources are disposed side by side in the front-rear direction of the vehicle lamp.

2. The vehicle lamp according to claim 1, wherein the light deflecting portion is configured as a reflecting surface that internally reflects light guided in the light guide.

3. The vehicle lamp according to claim 2, wherein the light incident portion is configured to cause the light from the plurality of light sources to be incident in a same direction, and the light deflecting portion is constituted by a plurality of reflecting surfaces having different inclination angles with respect to the incident direction of the light from each of the plurality of light sources.

4. The vehicle lamp according to claim 3, wherein the light guide is formed in a plate shape having one end surface serving as the light deflecting portion and a remaining end surface serving as the light emitting portion, and the light incident portion is formed in a portion close to the one end surface.

5. The vehicle lamp according to claim 4, wherein the plurality of reflecting surfaces are arranged in a direction that is the same as a width direction of the light emitting portion of the light guide.

6. The vehicle lamp according to claim 5, wherein a width dimension of light incident from the light incident portion to the light guide is substantially the same as a width dimension of the light emitting portion.

7. The vehicle lamp according to claim 2, wherein the reflecting surface includes a first reflecting surface corresponding to the first light source, and a second reflecting surface corresponding to the second light source, and
the first reflecting surface is disposed in a rear side and the second reflecting surface is disposed in a front side of the vehicle lamp.

8. The vehicle lamp according to claim 1, wherein a width dimension of the light emitting portion is smaller than a width dimension of the light deflecting portion.

9. The vehicle lamp according to claim 1, wherein a plurality fine optical steps is formed on a surface of the light emitting portion.

10. The vehicle lamp according to claim 1, wherein the first light source is configured to function as a clearance lamp as well as the daytime running lamp.

11. The vehicle lamp according to claim 1, wherein the first light source is disposed in a rear side and the second light source is disposed in a front side of the vehicle lamp.

12. The vehicle lamp according to claim 1, wherein a plurality of light deflecting portions is formed on a rear end surface of the light guide in a step shape along a vertical direction of the light guide.

13. The vehicle lamp according to claim 12, wherein a step portion is formed between adjacent light deflecting portions.

14. A vehicle lamp comprising:
a plurality of light sources; and
a light guide configured to guide light from the plurality of light sources that is incident from a light incident portion and emit the light from a light emitting portion, the light incident portion including a first light incident portion and a second light incident portion,
wherein the light guide includes a light deflecting portion that deflects a guide direction of the light between the light incident portion and the light emitting portion,
the light deflecting portion is configured to deflect the light from each of the plurality of light sources toward a same area of the light emitting portion,
the light from the plurality of light sources is incident in parallel with an optical axis of each of the first light incident portion and the second light incident portion,
each of the first light incident portion and the second light incident portion includes:
  a main incident portion positioned in a center of each of the first light incident portion and the second light incident portion so as to face a center of a light emitting surface of one of the plurality of light sources; and
  a pair of secondary incident portions positioned above and below the main incident portion, respectively, to form a line-symmetrical in a vertical direction, and
a first light source and a second light source of the plurality of light sources are disposed side by side in a front-rear direction of the vehicle lamp, and the first light incident portion and the second light incident portion are disposed side by side in the front-rear direction of the vehicle lamp.

\* \* \* \* \*